United States Patent [19]

Walter

[11] 4,118,542

[45] Oct. 3, 1978

[54] CONTROLLED ATMOSPHERE AND VACUUM PROCESSES

[75] Inventor: Peter Frank Walter, Swansea, Wales

[73] Assignee: Wall Colmonoy Corporation, Detroit, Mich.

[21] Appl. No.: 764,222

[22] Filed: Jan. 17, 1977

[51] Int. Cl.² .............................................. B22F 3/00
[52] U.S. Cl. ................... 428/553; 228/217; 252/181.2; 252/181.6
[58] Field of Search ............ 228/217; 252/181.2, 252/181.6; 428/553

[56] References Cited

U.S. PATENT DOCUMENTS

| | | | |
|---|---|---|---|
| 2,536,673 | 1/1951 | Widell | 252/181.6 |
| 2,943,181 | 6/1960 | Gunow et al. | 228/217 |
| 3,082,174 | 3/1963 | Perdijk et al. | 252/181.6 |
| 3,457,630 | 7/1969 | Schwartz et al. | 228/217 |
| 3,620,645 | 11/1971 | Porta et al. | 252/181.6 |
| 3,673,678 | 7/1972 | Moreau et al. | 228/217 |
| 3,917,151 | 11/1975 | Robinson | 228/217 |

*Primary Examiner*—Brooks H. Hunt
*Attorney, Agent, or Firm*—Harness, Dickey & Pierce

[57] ABSTRACT

This invention concerns getters for controlled atmosphere and vacuum processes, and in particular, for processes carried out in an atmosphere having a very low oxygen content. The invention has been particularly developed for the vacuum brazing of parts, such as gas turbine components, but has a wide variety of other applications, including argon purged retort brazing and diffusion bonding.

21 Claims, 1 Drawing Figure

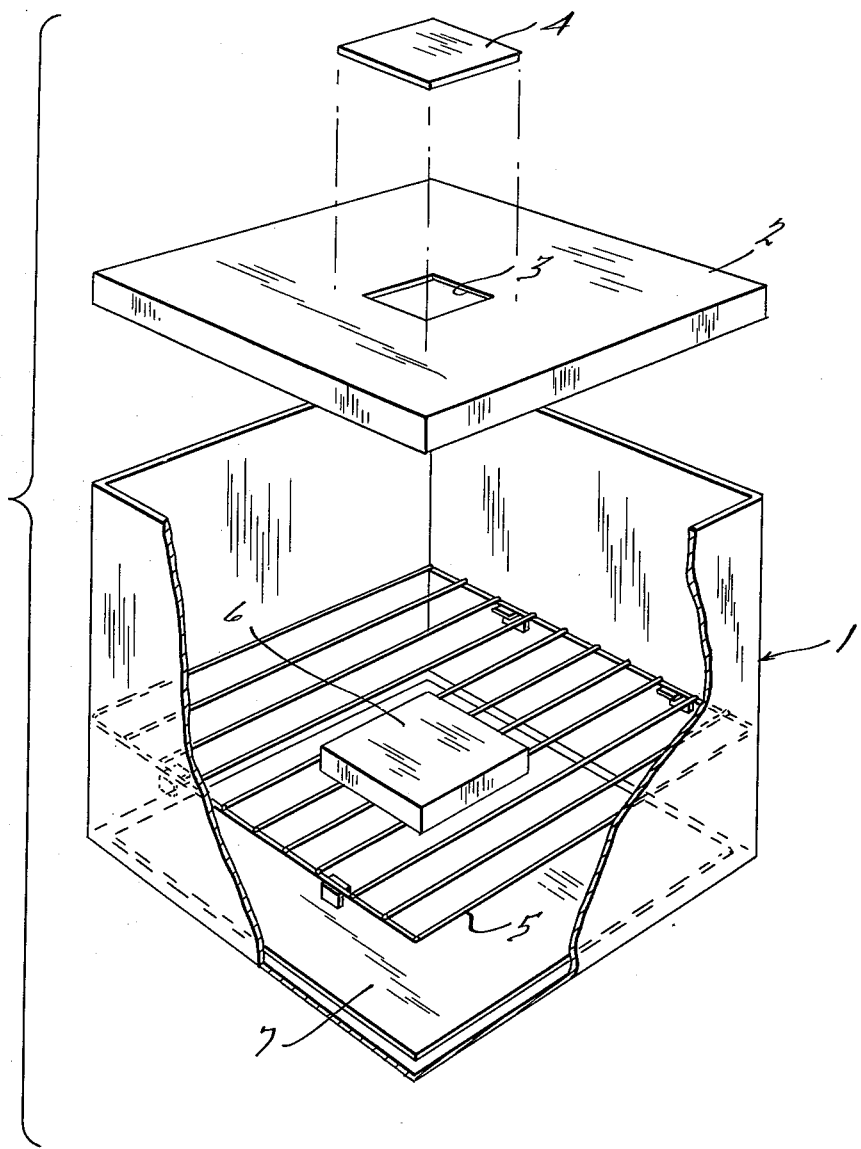

CONTROLLED ATMOSPHERE AND VACUUM PROCESSES

BACKGROUND OF THE INVENTION

Vacuum brazing is normally carried out in a furnace connected to a vacuum pump and the brazing may typically take place at a temperature of about 1100° C. and at a pressure of about $10^{-3}$ Torr. The low pressure is necessary to reduce the presence of molecular oxygen and gaseous oxygen-containing compounds to a minimum in view of the tendency of the metal parts being brazed to form oxide coatings. Oxide coatings which form on the metal surfaces to be joined and which remain at the brazing temperature seriously affect the wetting and flow properties of the brazing filler metal and thus the effectiveness of the brazing operation. The problem is particularly aggravated when the workpiece is formed from an alloy which contains an appreciable proportion of a particularly reactive metal, for example, a nickel or cobalt base high temperature alloy containing an aluminum and/or titanium addition to confer, for instance, age-hardening properties. There is a limit to the practical pressure reduction which can be achieved by a conventional vacuum pump, particularly because the effective pressure is that in the vicinity of the workpiece itself and this region, in which outgassing occurs, is baffled by the charge surround. A solution to this problem is to put in the furnace, at a point close to the workpiece for maximum effectiveness, a getter plate of a metal which has a greater affinity for oxygen than the workpiece. Titanium could be used for this purpose since substantially pure titanium or a high titanium content alloy would naturally be expected to have a greater affinity for oxygen than a titanium or aluminum alloy containing a relatively low proportion of titanium or aluminum (say 4-6%). However, titanium has not been found to be particularly effective and it has been necessary to use the more expensive metal zirconium. It has been found to be desirable to make the getter plate in the form of a shield, e.g., a cylinder with end plates, around the workpiece for maximum effectiveness. At the low pressures in question, this shield restricts admission of deleterious gases to the workpiece from the outside and performs a gettering function on gases which get into or arise within the enclosure.

A difficulty which has arisen in using this arrangement is that although the getter requires an elevated temperature to be effective, the brazing temperature is substantially higher than the optimum operating temperature for the getter and the getter tends to be mechanically weak and to sag at brazing temperatures. This can lead to serious damage to the workpiece and/or the support structure for the getter since zirconium and titanium, on the one hand, and iron, nickel, etc., on the other, fuse together to form low melting point phases at brazing temperatures. Thus, the use of titanium and zirconium getters is somewhat hazardous for use with very expensive workpieces.

SUMMARY OF THE INVENTION

I have now found that this problem can be overcome by using a liquid or semi-liquid phase getter. Thus, the invention provides a getter unit comprising a temperature resistant rigid support and a layer of getter material thereon which is liquid or semi-liquid at operating temperatures. These operating temperatures can be up to 2000° C. for some applications, but for normal vacuum brazing processes, they are in the range of 900° C. to 1300° C., preferably 1000° C. to 1200° C. Preferably the liquid getter material comprises a eutectic of titanium of zirconium and iron, nickel or chromium, which may be formed in situ either by heating titanium or zirconium powder on a base plate containing iron, nickel or chromium, or by heating a mixture of powders or a powdered alloy on an insert base plate. Conditions may be so controlled that the liquid getter has no tendency to flow off the support even when the layer is not horizontal.

BRIEF DESCRIPTION OF THE DRAWING

The drawing comprises a perspective view of a brazing box incorporating a getter material on a temperature resistant support placed within a box adapted to be placed in a vacuum brazing furnace.

DESCRIPTION OF THE PREFERRED EMBODIMENTS

In the preferred form of the invention, I provide a getter unit in the form of an expendable stainless steel sheet 0.030 inch thick, on which 0.01 gm–0.10, preferably 0.01–0.02 gm, titanium powder (e.g., of 120 mesh to −140, U.S.S.S.) per square centimeter is placed. When the sheet and powder have been heated to about 950° C., a so-called eutectic reaction takes place and a liquid low melting point titanium-iron phase forms and acts as the getter. By regulating the density and particle size range and distribution of the titanium powder applied to the stainless steel sheet and by selecting a sheet thickness safely above a minimum value, the extent of the eutectic reaction can be effectively controlled. Because of the limited amount of titanium available, a dross of titanium oxide is formed on the liquid and this gives it a certain viscosity which holds it in position on the steel plate, although in any case, a clear margin at the edge of the steel plate will be provided to constitute an area over which the liquid tends not to flow because of its physical properties. Additionally, the margin may be bent up or otherwise shaped to provide a retaining wall. It is envisaged that the getter plate may not only be used in a horizontal plane but, by adjusting the shape to provide retaining means and by adjusting the form and amount of the titanium powder to provide the desired physical properties, the getter plate can be disposed in a vertical plane. It is possible to form the eutectic phase in a preliminary heating operation carried out with the plate horizontal if necessary, but normally a small amount of a fugitive cement is used to initially bind the titanium particles. Fugitive cement or binders of the types suitable for use in the practice of the present invention comprise organic binders which are effective to form a temporary bond of the powder and are of a composition so that they will thermally decompose without leaving any residue during the subsequent heating operation. Fugitive binders of the foregoing type which can be satisfactorily used include solutions of plastic material, such as polyethylene, polypropylene, polyvinyl, polyvinylidene, polyvinyl alcohol, acrylic resins such as polymethylmethacrylate, or the like. A particularly satisfactory binder comprises Nicrobraz cement grade 500, which is commercially available from Wall Colmonoy Corporation.

It is also desirable to include a relatively low melting point promoter or flux (e.g., about 10% by weight of Nicrobraz 10 or Nicrobraz 50, commercially available from Wall Colmonoy Corporation) which are fusible nickel-base alloys, to facilitate the eutectic reaction in view of the titanium oxide which forms on the titanium particles during initial heating. Nicrobraz 10 is a nickel-base alloy of a nominal composition of about 11% phosphorus and the balance nickel; while Nicrobraz 50 is a nickel-base alloy of a nominal composition of 13% chromium, 10% phosphorus and the balance nickel. The getter plates of the invention can, therefore, be arranged in much the same way as the previously described titanium and zirconium getter plates and are not restricted to use in a horizontal plane. In particular, they may be supported directly on nickel alloy or other metallic support structure without the risk of the unwanted and uncontrolled eutectic reaction referred to above.

The resulting liquid film with a high titanium content has been found to have important advantages over wholly solid getter surfaces. Indeed, adequate protection by gettering has been obtained with titanium in circumstances where zirconium solid metal sheet has otherwise been found necessary. While I do not wish to be bound by any particular theory, it is believed that this is due to the greater capacity, and the greater absorption rate for impurities, of titanium rich liquid compared to solid titanium at a given temperature. This would arise because diffusion rates in liquids are greater than in solids of the same composition so that contaminating gases absorbed at the liquid surface are rapidly transported into the interior leaving a relatively clean surface for further absorption. A further advantage of using titanium powder is that during the early stages of heating to the brazing temperature, the large surface area of the titanium gives a substantially enhanced solid gettering action.

In a modification of the preferred form of the invention, a getter plate is made from a material which is inert to titanium. Iron or nickel powder or a powder of an alloy of iron or nickel with chromium is mixed with the titanium powder; a wide variety of proportions is possible depending on the extent of the eutectic reaction required, the physical properties of the liquid film, etc. For example, equal parts by weight of titanium and nickel powders, preferably with the cement and promoter described above, are deposited on an alumina, titania, zirconia or similar refractory tile or are placed within a shallow depression in such a tile.

In a further alternative, the getter plate is prepared from titanium which has been pre-alloyed with iron or nickel and the alloy powder is used wholly or partly instead of the titanium powder or the mixture of titanium powder and iron or nickel powder described above.

Even if the getter plate takes part in a eutectic reaction, the use of such an alloy may be desirable in view of certain disadvantages in using titanium powder.

The purpose of the getter units according to the invention is to absorb deleterious gases which would otherwise contaminate the workpiece. The degree of such protection conferred by the getter unit on the workpiece is related to the total getter area on the one hand and the rate of arising of deleterious gas on the other.

Where the comparative cleanliness of the workpiece and surrounding furnace structure is such that most gas arises from the furnace, it is desirable to enclose the workpiece in a clean metallic box also containing getter surfaces. This is illustrated in the accompanying drawing described below.

Where the workpiece itself offers opportunity for partial or complete enclosure by a getter surface, for example, where the joint is inside a hollow cylindrical or conical assembly, the getter unit may be in the form of an end plate or end plates to substantially complete such an enclosure. An advantage of the invention is that a plate forming the base of the enclosure may have a central hearth portion for supporting the workpiece and an annular surrounding area either separated by a retaining wall or at a lower level on which the liquid getter film is formed.

In vacuum furnaces constructed so that the internal heat shields are metallic, it may be less desirable to additionally enclose the workpiece and getter units in a metallic box because the furnace construction already largely serves this function.

In individual applications, the required area of getter must be determined by trial having regard to the metallurgical requirements of the test piece and the characteristics of the vacuum furnace. It has been found in practice that a getter unit large enough to substantially occupy one face of a cubic box confers the protection required in applications presently investigated. This requirement is most simply met by placing the getter unit on the bottom inside face of the box. However, investigations have also shown that molten films of sufficient stability can be obtained which permit vertical or inverted application of the getter units, particularly if getter units prepared as previously described are subjected to a prior, horizontal, vacuum furnace fusing cycle at a comparatively low temperature. It is believed this is possible because of the self-regulating nature of the process of formation of the low melting point phases, whereby a too-fluid film will tend to dissolve more metallic substrate until its fluidity is reduced so that it becomes less mobile. In this manner, enclosures incorporating non-horizontal getter plates are envisaged for applications requiring greater gettering capacity, in particular, those applications where a totally enclosing metallic box is dispensed with on grounds of operational convenience.

Although the invention has been particularly described with reference to titanium (including alloys thereof), as the primary getter component, other so-called active metals with a low vapor pressure, such as zirconium, may be used. As far as the other components of the eutectic are concerned, these may be iron or nickel or other alloying elements of low volatility capable of giving rise to low melting point titanium etc. rich phases. The added presence of chromium may in certain cases be desirable, since while its presence as a constituent of a low melting alloy is incidental, it confers valuable corrosion resistance properties during storage.

Reference has been made to titanium and zirconium powders, but the term "powder" is not intended in a limited sense and chopped titanium and zirconium foil may be used, e.g., finely chopped titanium or titanium-rich alloy swarf. This alternative form may have handling advantages; on the other hand, the promoter and other metallic powders (when used) are conveniently in conventional form, e.g., as a medium fine powder such as −120 mesh. The accompanying drawing illustrates, by way of example, a workpiece-enclosure for a vacuum brazing operation. The enclosure comprises a box 1 and a lid 2 which, in position overlaps the upper edges of the box 1. The lid 2 has an aperture 3, adapted to be partly covered by a plate 4, to assist in primary evacuation. The box 1 has a horizontal grid 5 for supporting the workpiece 6 to be brazed and in the bottom of the box is a getter plate 7 in accordance with the invention. The box with the lid in position is used in a conventional cold wall furnace.

In accordance with the process aspects of the present invention, the vacuum brazing of parts or workpieces is achieved by preliminarily cleaning the surfaces or areas of the parts to which the brazing filler metal is to be applied. The brazing filler metal normally in the form of a finely-particulated powder is applied to such selected areas and is conveniently held in place utilizing a fugitive binder of the type which is adapted to volatilize and/or thermally decompose without residue at the elevated brazing temperatures encountered during the brazing process. The brazing filler metal may comprise any one of the various types well known in the art, and conventionally comprises nickel or cobalt base alloys containing appreciable quantities of chromium which are particularly suitable for use in brazing parts and workpieces comprised of high temperature alloys of the type employed in the hot zones of nuclear reactors and aircraft jet engines and the like. Typically, such a brazing filler metal nominally contains about 19% chromium, 10.2% silicon, with the balance consisting essentially of nickel and is commercially available under the brand designation "Nicrobraz 30" from Wall Colmonoy Corporation. The foregoing brazing filler metal has a nominal solidus of 1975° F. and a nominal liquidus of 2075° F. and can be satisfactorily furnace brazed at a temperature ranging from about 2100° F. to about 2200° F. It will be appreciated that the specific composition of the brazing filler metal and the particular brazing temperatures employed can be varied in accordance with known brazing technology to provide optimum results in accordance with the type and alloy composition of the parts brazed.

The part having the brazing filler metal applied thereto is thereafter placed in a vacuum furnace and preferably is enclosed within a workpiece-enclosure such as shown in the drawing. The interior of the vacuum furnace is initially evacuated and preferably is back-filled with a substantially dry pure inert gas, such as argon or helium, for example, whereafter it is again evacuated to the desired vacuum, whereby a substantial purging of reactive oxygen molecules from the interior of the furnace and workpiece-enclosure is effected. The furnace thereafter is heated to the desired elevated brazing temperature at which the brazing filler metal melts and flows in wetted relationship on the surface of the part being brazed, while at the same time, the getter becomes at least partially molten, providing a liquid phase which is effective to preferentially react with any residual reactive oxygen present. The brazing operation is carried out for a period of time sufficient to obtain the necessary flow and wetting of the brazing filler metal, and preferably is continued so as to provide for some interdiffusion of the brazing filler metal with the substrate of the part being brazed.

At the conclusion of the brazing operation, the part is cooled and the vacuum is released, whereafter the part can be extracted from the furnace chamber.

While it will be apparent that the invention herein described is well calculated to achieve the benefits and advantages set forth above, it will be appreciated that the invention is susceptible to modification, variation and change without departing from the spirit thereof.

What is claimed is:

1. A getter unit for controlled atmosphere and vacuum high temperature processes comprising a temperature resistant rigid support and a layer of a metallic substance thereon having an affinity for oxygen which is adapted to be at least in partially molten liquid state at the elevated operating temperature of the process.

2. The getter unit as described in claim 1, in which said metallic substance comprises a low melting alloy incorporating a metal selected from the group consisting of zirconium and titanium.

3. The getter unit as described in claim 1, in which said metallic substance comprises a eutectic alloy of a metal selected from the group consisting of zirconium and titanium.

4. The getter unit as described in claim 1, in which said metallic substance comprises a low melting alloy incorporating a metal selected from the group consisting of zirconium and titanium in combination with a metal selected from the group consisting of iron, nickel, chromium and mixtures thereof.

5. The getter unit as described in claim 1, in which said metallic substance comprises a eutectic alloy incorporating a metal selected from the group consisting of zirconium and titanium in combination with a metal selected from the group consisting of iron, nickel, chromium and combinations thereof.

6. The getter unit as described in claim 1, in which at least the surface stratum of said support comprises a metal selected from the group consisting of iron, nickel, chromium and mixtures thereof and said metallic substance is a metal selected from the group consisting of zirconium and titanium which upon heating to said elevated operating temperature coreact to produce an alloy of which at least a portion thereof is in a molten liquid state.

7. The getter unit as described in claim 1, in which at least the surface stratum of said support comprises a ferrous alloy and said metallic substance is a metal selected from the group consisting of zirconium and titanium which upon heating to said elevated operating temperature coreact to produce an alloy of which at least a portion thereof is in a molten liquid state.

8. The getter unit as described in claim 1, in which at least the surface stratum of said support is comprised of steel and said metallic substance is a metal selected from the group consisting of zirconium and titanium which upon heating to said elevated operating temperature coreact to produce an alloy of which at least a portion thereof is in a molten liquid state.

9. The getter unit as described in claim 1, in which said metallic substance is in the form of a powder.

10. The getter unit as described in claim 1, in which said metallic substance is in the form of a powder bonded to the surface of said support by a fugitive binder.

11. The getter unit as described in claim 1, in which at least the surface stratum of said support comprises a metal selected from the group consisting of iron, nickel, chromium and mixtures thereof and said metallic substance is in the form of a metal powder selected from the group consisting of zirconium and titanium which upon heating to said elevated operating temperature coreact to produce an alloy of which at least a portion thereof is in a molten liquid state.

12. The getter unit as described in claim 11, in which said metal powder is bonded to the surface of said support by a fugitive binder.

13. The getter unit as described in claim 11, in which said metal powder is of a particle size less than about 120 mesh.

14. The getter unit as described in claim 11, in which said metal powder consists essentially of titanium and is applied in an amount of about 0.01 to about 0.1 gram per square centimeter.

15. The getter unit as described in claim 11, in which said metal powder further includes up to about 10% by weight of a low melting fusible nickel-base alloy as a fluxing agent.

16. The getter unit as described in claim 1, in which said support is comprised of a refractory material inert to zirconium and titanium and wherein said metallic substance comprises a powder of a metal selected from the group consisting of zirconium and titanium in combination with a powder selected from the group consisting of iron, nickel, chromium and mixtures thereof.

17. The getter unit as described in claim 16, in which said powder is a mechanical mixture of the individual elements.

18. The getter unit as described in claim 16, in which at least a portion of said powder is pre-alloyed.

19. The getter unit as described in claim 1, in which said metallic substance is adapted to be at least in partially molten liquid state at 900° C.

20. The getter unit as described in claim 1, in which the surface of said support is substantially planar.

21. A vacuum brazing furnace defining a chamber and a getter unit in said chamber comprising a temperature resistant rigid support and a layer of a metallic substance thereon having an affinity for oxygen which is adapted to be at least in partially molten liquid state at the elevated operating temperature of the furnace.

* * * * *